United States Patent
Sivaraman

(10) Patent No.: US 10,909,389 B2
(45) Date of Patent: Feb. 2, 2021

(54) TRAFFIC DIRECTION GESTURE RECOGNITION

(71) Applicant: Apple Inc., Cupertino, CA (US)

(72) Inventor: Sayanan V. Sivaraman, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/709,402

(22) Filed: Sep. 19, 2017

(65) Prior Publication Data

US 2018/0082134 A1  Mar. 22, 2018

Related U.S. Application Data

(60) Provisional application No. 62/396,988, filed on Sep. 20, 2016.

(51) Int. Cl.
   *G06K 9/00* (2006.01)
   *G08G 1/005* (2006.01)
   (Continued)

(52) U.S. Cl.
   CPC ......... *G06K 9/00791* (2013.01); *B60Q 1/346* (2013.01); *B60Q 1/503* (2013.01);
   (Continued)

(58) Field of Classification Search
   CPC .......... G06K 9/00791; G06K 9/00375; G06K 9/00355; G06K 9/00818; G05D 1/0088;
   (Continued)

(56) References Cited

U.S. PATENT DOCUMENTS

| 9,014,905 B1 | 4/2015 | Kretzschmar et al. |
| 2010/0235034 A1* | 9/2010 | Higgins ............... G05D 1/0083 701/28 |

(Continued)

FOREIGN PATENT DOCUMENTS

DE 10-2013219038 3/2015

OTHER PUBLICATIONS

Guo et al. "Gesture Recognition for Chinese Traffic Police." International Conference on Virtual Reality and Visualization, Oct. 17, 2015, pp. 64-67 (Year: 2015).*

(Continued)

*Primary Examiner* — Jon Chang
(74) *Attorney, Agent, or Firm* — Robert C. Kowert; Meyertons, Hood, Kivlin, Kowert & Goetzel, P.C.

(57) ABSTRACT

Traffic direction gesture recognition may be implemented for a vehicle in response to traffic diversion signals in the vehicles vicinity. Sensors implemented as part of a vehicle may collect data about pedestrians and other obstacles in the vicinity of the vehicle or along the vehicle's route of travel. Sensor data may be combined and analyzed to identify a traffic diversion condition, including identifying a traffic director directing traffic using gestures or signs. Gestures of a traffic director may be interpreted and understood by the vehicle as commands to perform maneuvers related to the traffic diversion, including stopping, slowing, or turning onto a detour route. The vehicle may be equipped with a command acknowledgement device for acknowledging to a traffic director the vehicle's understanding of the traffic diversion condition or maneuver commands. Information, such as traffic diversion and detour information, may be shared with other vehicles and devices, or stored in a database.

26 Claims, 9 Drawing Sheets

(51) Int. Cl.
*B60Q 1/50* (2006.01)
*B60Q 1/34* (2006.01)
*B60W 30/00* (2006.01)
*B60W 30/18* (2012.01)
*G08G 1/0962* (2006.01)
*G08G 1/0955* (2006.01)
*G08G 1/01* (2006.01)
*G08G 1/0967* (2006.01)

(52) U.S. Cl.
CPC ...... *B60W 30/00* (2013.01); *B60W 30/18154* (2013.01); *G06K 9/00355* (2013.01); *G06K 9/00389* (2013.01); *G06K 9/00805* (2013.01); *G08G 1/005* (2013.01); *G08G 1/0955* (2013.01); *G08G 1/09623* (2013.01); *B60W 2420/42* (2013.01); *G08G 1/0112* (2013.01); *G08G 1/0133* (2013.01); *G08G 1/0141* (2013.01); *G08G 1/096775* (2013.01); *G08G 1/096791* (2013.01)

(58) Field of Classification Search
CPC .. G08G 1/005; G08G 1/0955; G08G 1/09623; G08G 1/096766; G08G 1/0112; G08G 1/096791; G08G 1/0141; G08G 1/096775; G08G 1/0133; B60Q 1/346; B60Q 1/503; B60W 30/00
See application file for complete search history.

(56) References Cited

U.S. PATENT DOCUMENTS

2015/0336502 A1 11/2015 Hillis et al.
2016/0144867 A1 5/2016 Delp et al.
2016/0167648 A1 6/2016 James et al.
2016/0171313 A1 6/2016 Huang et al.

OTHER PUBLICATIONS

Song et al. "Recognition Method of Traffic Police and Their Command Action Based on Kinect." Proceedings of the 33rd Chinese Control Conference, Jul. 28, 2014, pp. 3361-3366 (Year: 2014).*
International Search Report and the Written Opinion from PCT/US2017/052566, dated Jan. 29, 2018, Apple Inc. 17 pages.
Invitation to Pay Additional Fees from PCT/US2017/052566, dated Dec. 4, 2017, Apple Inc. pp. 13.

* cited by examiner

TRAFFIC DIRECTION GESTURE RECOGNITION

This application claims benefit of priority to U.S. Provisional Application No. 62/396,988, filed Sep. 20, 2016, titled "Traffic Direction Gesture Recognition," which is hereby incorporated by reference in its entirety.

BACKGROUND

Vehicle safety improvements and the rise of interest in automated navigation and control of vehicles have led to the inclusion of different types of remote sensing equipment installed on vehicles. These sensors can include one or more radars, ultrasonic sensors, light beam scanning devices, visible light camera devices, infrared camera devices, near-infrared camera devices, and depth camera devices which can include one or more light-scanning devices, including LIDAR devices, etc. Automated navigation and control systems may process data collected by the sensors in order to detect and characterize objects in the environment for various purposes.

One purpose for detecting and characterizing objects in the environment is to increase efficiency and safety of travel, which can also reduce travel times, decrease fuel usage, reduce environmental pollution associated with vehicular travel, and decrease overall travel costs, among other potential benefits. However, current autonomous vehicle systems typically return control to the driver in the event of an unexpected traffic diversion or any number of other atypical driving situations.

Current technologies include GPS-based navigation applications that can display real-time traffic conditions to a vehicle operator; analyze traffic conditions, a vehicle destination, and mapping data; and recommend a travel route based on various user-configured or default preferences. Other technologies allow for detection of surrounding vehicles and other traffic obstacles, primarily with the intent to help prevent collisions, as in the case of blind-spot detection and warning devices and similar systems. Some modern cruise control systems, such as a typical "adaptive cruise control" system pursue a target vehicle speed and may adjust speed for safety purposes (e.g. to maintain a safe following distance). However, none of these systems addresses unexpected traffic diversions where a pedestrian may be manually directing traffic, for example due to an accident, special event, or road hazard.

SUMMARY

Sensors implemented as part of a vehicle may collect data about an environment, surrounding a vehicle, such as the locations of pedestrians and other obstacles or the existence of an unexpected situation such as a traffic diversion. A sensor fusion module may collect and process data from various sensors. A traffic direction gesture recognition system be implemented for a vehicle in response to traffic diversion signals in the vehicles vicinity. Sensor data may be combined and analyzed to identify a traffic diversion condition, including identifying a traffic director directing traffic using gestures or signs. Gestures of a traffic director may be interpreted and understood by the vehicle as commands to perform maneuvers related to the traffic diversion, including stopping, slowing, or turning onto a detour route. The vehicle may be equipped with a command acknowledgement device for acknowledging to a traffic director the vehicle's understanding of the traffic diversion condition or maneuver commands. Information, such as traffic diversion and detour information, may be shared with other vehicles and devices, or stored in a database.

Figure 1:
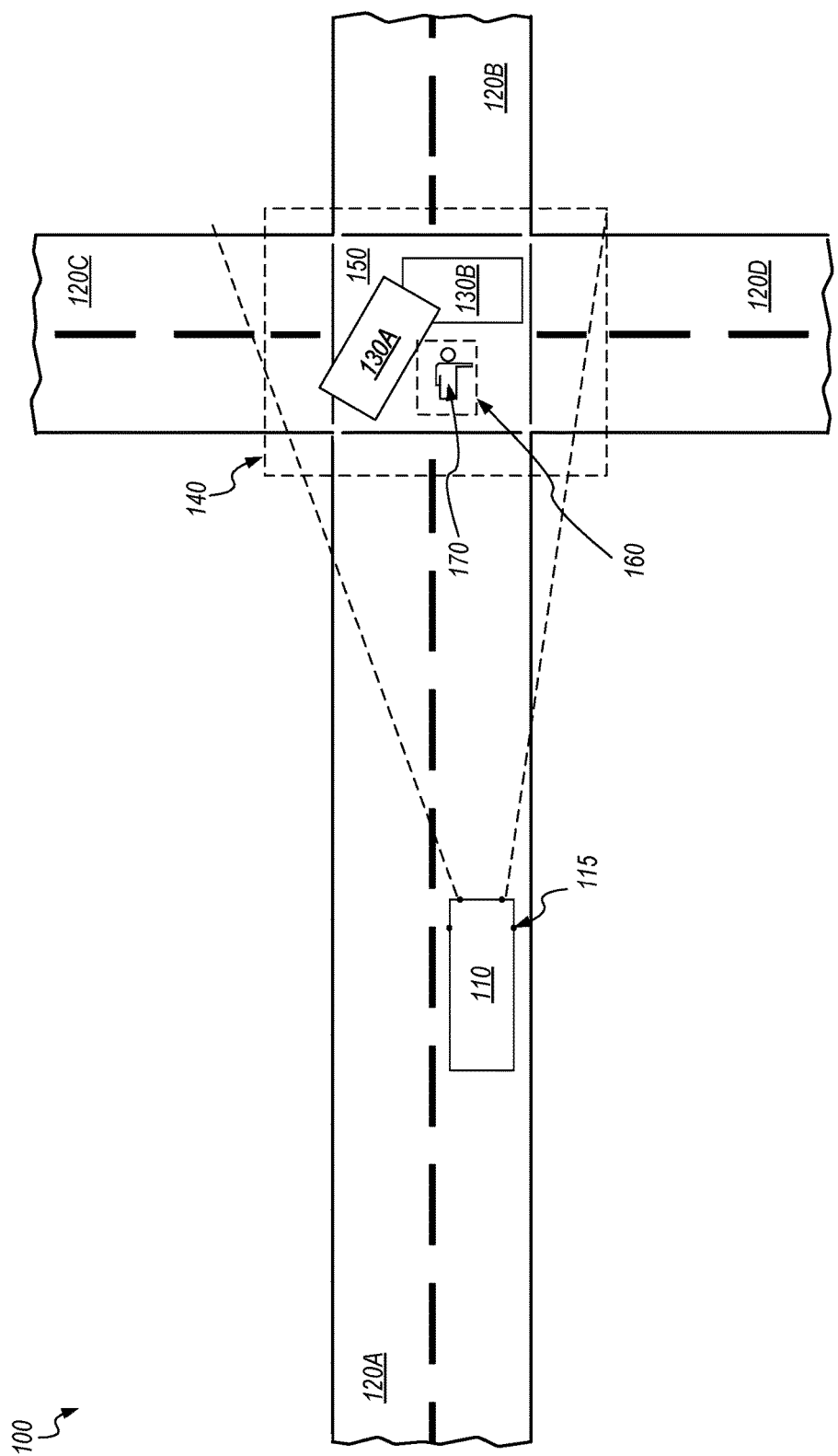
FIG. 1 illustrates an overhead diagram of an environment for implementing traffic direction gesture recognition, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described here may implement traffic direction gesture recognition.

FIG. 1 illustrates an overhead diagram of an environment for implementing traffic direction gesture recognition, according to some embodiments. Traffic direction gesture recognition may be implemented with regard to vehicle 110 within environment 100. Environment 100 of FIG. 1 includes multiple roadways 120A-120D intersecting at roadway intersection 150.

In the example of FIG. 1, vehicle 110 is approaching intersection 150 via roadway 120A, initially intending to continue through intersection 150 onto roadway 120B. Vehicle 110 includes an environmental analysis module (described in detail below with reference to FIG. 2) for monitoring the environment 100 in the vicinity of vehicle 110. As shown, obstacles 130A and 130B are blocking intersection 150. Obstacles 130A and 130B may be, for example, other vehicles on the roadway, debris, or construction equipment.

Vehicle 110 may additionally include one or more sensors 115 via which vehicle 110 can monitor the environment 100 and send data to the environmental analysis module or other control modules of the vehicle. In some embodiments, the sensors 115 may include one or more radars, ultrasonic sensors, light beam scanning devices, visible light camera devices, infrared camera devices, near-infrared camera devices, and depth camera devices which can include one or more light-scanning devices, including LIDAR devices, etc. These sensors may be physically located within vehicle 110. In some embodiments, some or all of the sensors may be physically located separately from the vehicle, for example on surrounding vehicles or other obstacles, mounted on stationary objects such as light poles or street signs, or embedded within a road surface.

In some embodiments, one or more sensors coupled to vehicle 110 detect one or more of obstacles 130A and 130B, which may be surrounding vehicles or other obstacles such as road debris or road surface imperfections located in roadways 120A-120D, or other locations now shown in FIG. 1. In some embodiments, sensors coupled to vehicle 110 may detect and measure characteristics of travel lanes in the vicinity of vehicle 110. For example, sensors coupled to vehicle 110 may detect one or more of a lateral position, width, curvature, lane marking type and position, or other characteristics of a travel lane. In some embodiments, the sensors may be configured to detect one or all of a position, speed, and size of one or more of obstacles 120a-120k. In some embodiments, some data associated with travel lanes or obstacles may be provided to vehicle 110 from one or more other sources, such as sensors located external of vehicle 110, a navigation system or database, a GPS system, a handheld device, or another vehicle's sensor or traffic gesture recognition system.

The environmental analysis module of vehicle 110 may detect at 140 an abnormal traffic condition or traffic diversion. For example, the environmental analysis module may use any combination of local and remote navigational data, road signs, past observations at the same intersection, data and time information, or other suitable information available to vehicle 110 in order to determine that the present situation of intersection 150 includes an abnormal condition.

Vehicle 110 may detect 160 a pedestrian 170 near the abnormal traffic condition. A gesture recognition module (described in detail below with reference to FIG. 2) of vehicle 110 may detect if a gesture is a recognized traffic direction command. If a gesture is recognized, the vehicle may prepare to take the action or perform a maneuver associated with the gesture.

When vehicle 110 has recognized a traffic direction command, according to some embodiments, the vehicle may communicate an acknowledgement to the pedestrian acting as a traffic director. For example, if the traffic direction command indicates that vehicle 110 should turn, vehicle 110 may use its turn signal indicator. Alternatively or additionally, vehicle 110 may use a display to communicate with the traffic director—for example, an LED or other light display, a video screen, or an audible notification.

In some embodiments and situations—vehicle 110 may not wait for confirmation of its correct understanding of a traffic direction gesture. For example, vehicle 110 may be configured to always stop immediately upon detecting a stop signal. Safety equipment on a typical autonomous vehicle may include software to slow or stop the car when obstacles or safety hazards are detected, regardless of traffic gesture detection logic, systems, or methods.

Alternatively or additionally, vehicle 110 may detect a pedestrian acting as a traffic director independently of any other indication or detection that an abnormal traffic condition exists. For example, if a detected pedestrian performs a recognized command gesture, the vehicle 110 may recognize that pedestrian as a traffic director without having first detected an abnormal traffic condition. In some embodiments, additional functionality may be implemented to verify whether a detected command is legitimate when vehicle 110 has not otherwise detected an abnormal traffic condition.

Figure 2:
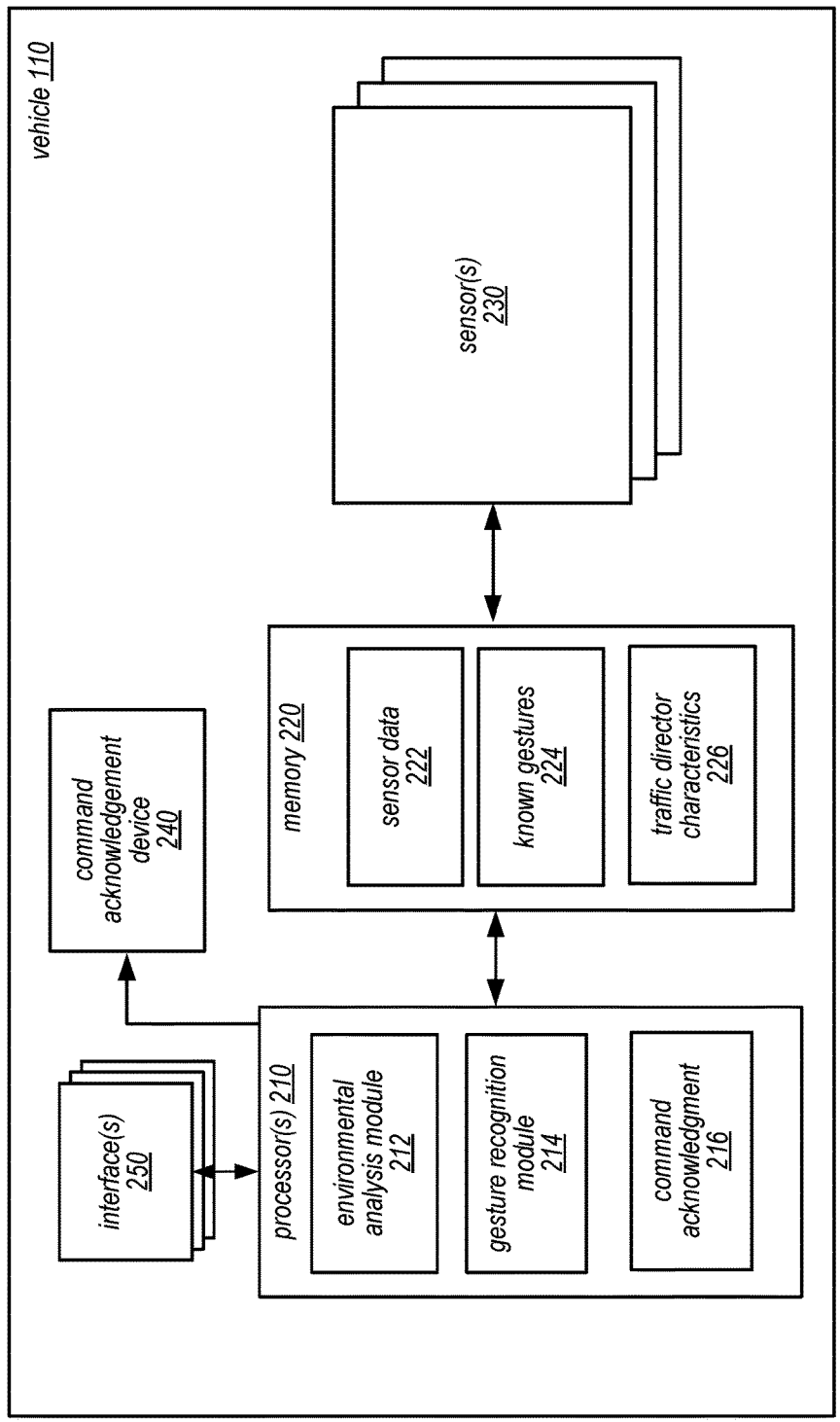
FIG. 2 illustrates a logical block diagram of a vehicle that implements traffic direction gesture recognition, according to some embodiments.

FIG. 2 illustrates a logical block diagram of a vehicle that implements traffic direction gesture recognition, according to some embodiments. In some embodiments, vehicle 110 may include one or more sensors 230 as described herein. In some embodiments, the sensors may include one or more radars, ultrasonic sensors, light beam scanning devices, visible light camera devices, infrared camera devices, near-infrared camera devices, and depth camera devices which can include one or more light-scanning devices, including LIDAR devices, etc. Vehicle 110 may include interfaces 250 for user control or various communication of data as described herein or required for operation of an autonomous vehicle.

In some embodiments, sensor 230 collects data and sends the data to a memory 220 of vehicle 110, where some or all of the raw sensor data may be stored as sensor data 222 within memory 220. Memory 220 may also exchange other data with sensors 230 in some embodiments, for example to set or modify operating parameters of one or more sensors 230 or monitor error conditions of sensors 230.

Memory 220 according to some embodiments may also store known gestures 224, which may be compared at gesture recognition module 214 to gestures detected environmental analysis module 212. In some embodiments, some or all of known gesture data 224 may be stored by a manufacturer or operator of a vehicle, or supplied from an outside database such as a law or traffic enforcement database. Examples of possible traffic gestures are shown and discussed below with reference to FIG. 7.

Memory 220 according to some embodiments may additionally store traffic director characteristics 226, which may be used by environmental analysis module 212 to recognize a pedestrian acting as a traffic director. In some embodiments, some or all of traffic director characteristics 226 may be stored by a manufacturer or operator of a vehicle, or supplied from an outside database such as a law or traffic enforcement database.

Vehicle 110 may also include a processor 210, according to some embodiments. In some embodiments, processor 210 may be a general computer processor of vehicle 110 with many other functions. In other embodiments, processor 210 may include a processor dedicated to functions related to implementing traffic direction gesture recognition.

Processor 210 may implement environmental analysis module 212 for analyzing stored sensor data 222 and/or raw data from sensors 230. In some embodiments, environmental analysis module 212 may receive information about pedestrians and other obstacles in the vicinity of vehicle 110. For example, environmental analysis module 212 may implement lidar-based obstacle detection and scene segmentation, for example using a particle-based occupancy grid.

In some example embodiments, environmental analysis module 212 may project lidar obstacle points into a calibrated image plane of a camera of vehicle 110. Environmental analysis module 212 may further implement various pedestrian detection methods, for example, machine-learning-based pedestrian detection methods based on aggregated channel features, adaptive boosting, or neural networks. In some example embodiments, each piece of data available to an environmental analysis module 212 (e.g. colors, signs, gestures, etc.) may be combined or fused and analyzed using a random forest classifier.

In some example embodiments, environmental analysis module 212 may additionally attempt to characterize detected pedestrians, for example to identify a pedestrian acting as a traffic director. In some situations, the appearance of a pedestrian acting as a traffic director may include distinguishing features. For example, various authorities may wear particular colors (e.g. bright yellow or orange, or dark blue) when directing traffic. This information may, for example, be stored in a database, learned by the environmental analysis module, or a combination thereof.

In some embodiments, a pedestrian may hold a road sign, for example, one or more of a "SLOW," "STOP," "CROSSING," or "DETOUR" sign. In other examples, temporary or permanent road signs may be taken into account by the environmental analysis module 212, in combination or independently of a detected traffic director, and/or independently of whether the sign is held by a pedestrian.

In some situations, the appearance of a pedestrian legitimately acting as a traffic director may not include any distinguishing characteristics. For example, consider the situation of a traffic accident or road hazard when no law enforcement or emergency personnel or equipment is present at the scene. A passerby or motorist who has exited his or her vehicle may legitimately direct other vehicles away from the danger or road hazard. In such a situation, this traffic director may be detected based solely on gestures, for example gestures stored in a database of known traffic direction gestures. In other embodiments, a traffic director may be identified using a combination of a detected abnormal traffic condition and gestures of the traffic director that indicate or suggest in some way that the traffic director is not a typical pedestrian.

Environmental analysis module 212 according to some embodiments may detect gestures of pedestrians. For example, a pedestrian who makes a gesture known to environmental analysis module 212 or gesture recognition module 214 to be a traffic direction gesture may be identified as acting as a traffic director. In some embodiments, the identification as a traffic director may further require concurrent detection of an abnormal traffic condition, particularly if the environmental analysis module can detect no other distinguishing characteristic of the pedestrian that suggests the pedestrian is validly acting as a traffic director.

According to some embodiments, a pedestrian exhibiting behavior consistent with a traffic director, even in the absence of a recognized gesture, may be characterized as a traffic director or possible traffic director. For example, a pedestrian who stands near a roadway and exhibits behavior not recognized by environmental analysis module 212 as being typical of a pedestrian may be recognized as a possible traffic director, particularly when an abnormal traffic condition is detected. According to some embodiments, vehicle 110 may then seek additional resources to attempt to identify the gestures, such as contacting other nearby vehicles or law enforcement, or accessing remote databases via a network.

When environmental analysis module 212 has detected a gesture of an identified traffic director, possible traffic director, or other pedestrian, gesture recognition module 214 may attempt to identify the gesture. For example, gesture recognition module may search a local (known gestures 224) or remote database for known gestures that match a recognized gesture.

According to some embodiments, environmental analysis module 212 or gesture recognition module 214 may employ a hidden Markov model, Recurrent Neural Network, or other sequential classifier—applied, for example, as a spatio-temporal classification of a pedestrian's activity. A hidden Markov model, Recurrent Neural Network, or other sequential classifier may be developed, for example, for a "directing traffic" state, which if detected would indicate that a pedestrian is a likely traffic director.

According to some embodiments, if a gesture is recognized, for example, by matching a known maneuver command, vehicle 110 may perform the maneuver immediately. In other embodiments, vehicle 110 may acknowledge the recognized command or seek confirmation from the traffic director.

For example, command acknowledgement module 216 may operate command acknowledgement device 240 to communicate the vehicle's understanding of the detected command. According to some embodiments, command acknowledgement device 240 may include any or all of a turn signal, LED or other visual display, a video screen, or an audible notification. A traffic director according to some embodiments may acknowledge, positively or negatively, for example using another simple gesture (e.g. thumbs up or down) whether vehicle 110 has understood the traffic command correctly. In some embodiments, a command acknowledgement or traffic director acknowledgement may be made electronically, for example as a signal to an autonomous control or other computing system.

One of ordinary skill will recognize that separation of responsibilities between elements 212-216 are abstractions, and that any of elements 212-216 may perform one or several of the functions described herein with reference to any other of those modules.

In various embodiments, any or all of the data described herein as being generated or processed at vehicle 110 may be shared with other devices and systems, for example with other nearby vehicles, law or traffic enforcement officials or systems, a navigation system, or a remote database or other storage system.

Figure 3:
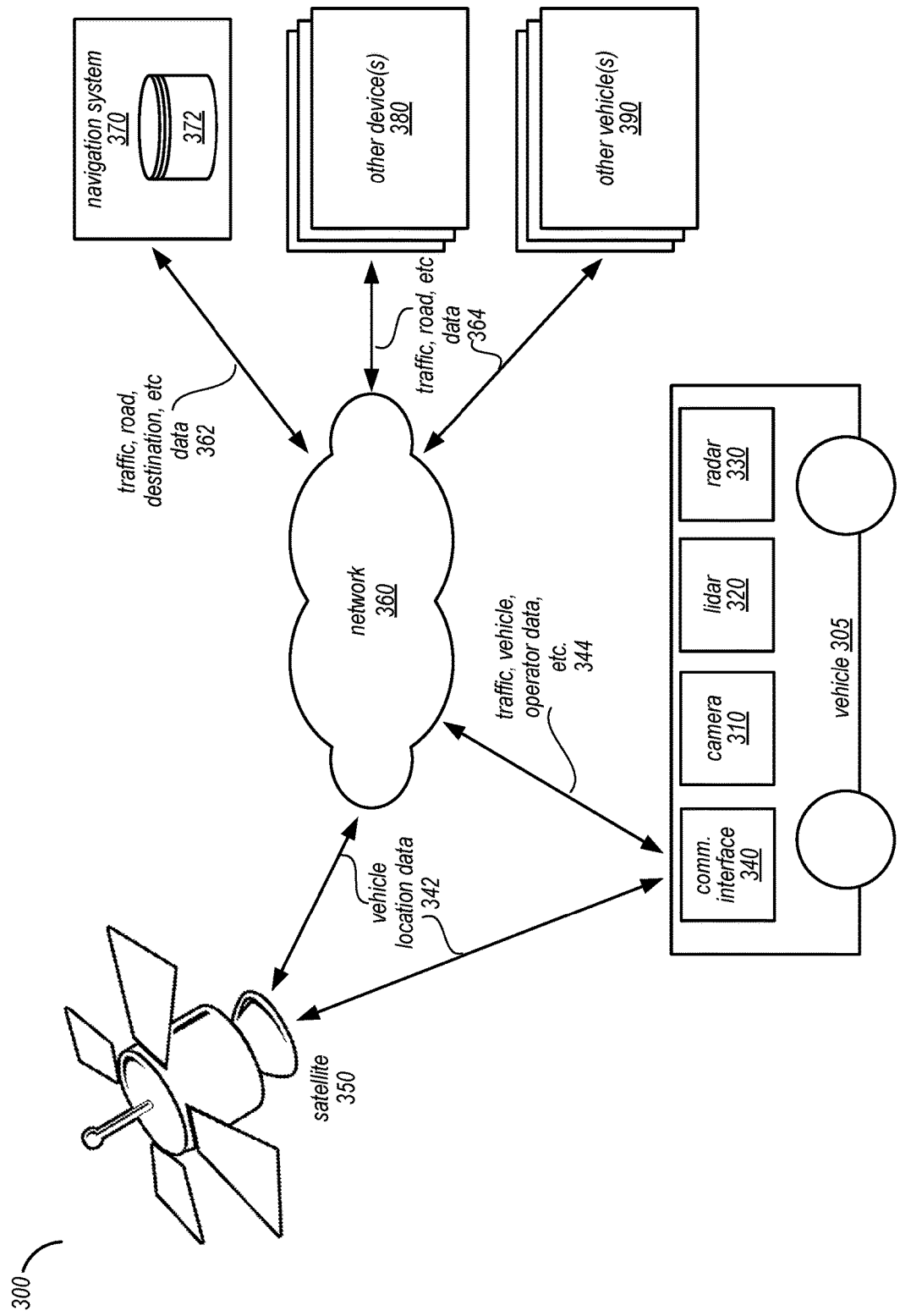
FIG. 3 illustrates a logical block diagram including interactions of a vehicle that implements traffic gesture recognition, according to some embodiments.

FIG. 3 illustrates a logical block diagram including interactions of a vehicle that implements traffic gesture recognition, according to some embodiments. Vehicle 305 of example system 300 includes example sensors 310, 320, and 330. Camera 310 according to some embodiments may include a visible light camera used for detecting lane information as described herein.

Lidar 320 of vehicle 305, according to some embodiments, may be used to detect pedestrians, other vehicles, and other obstacles in the vicinity of vehicle 305, as described herein. Lidar 320 according to some embodiments may detect a three-dimensional position, three-dimensional size, and three-dimensional velocity of one or more obstacles located in or near one or more travel lanes in the vicinity of vehicle 305.

Radar 330 of vehicle 305, according to some embodiments, may be used, at least in part, to detect or verify velocities of other vehicles or obstacles traveling or stationary in the vicinity of vehicle 305. One of ordinary skill in the art will understand that sensors of vehicle 305, including example camera 310, lidar 320, and radar 330, may overlap in function or may be redundant with specific types of data. Such redundancy according to some embodiments may serve to verify or increase the overall accuracy of sensor data of vehicle 305.

Vehicle 305 may communicate, according to some embodiments, via one or more communications interfaces 340. In some embodiments, one or more satellite devices 350, such as a device implementing a global positioning system ("GPS"), may communicate to vehicle 305 via communications interface 340. For example, vehicle 305 may receive information about its position via data including vehicle location data 342.

Vehicle 305 may also communicate with network 360, for example to send data 344 including for example abnormal traffic conditions, detour information, traffic director information, traffic metrics, vehicle operator data, lane recommendations, and other data associated with implementing traffic direction gesture recognition. Vehicle location data 342 may also be shared with network 360 via satellite 350 or vehicle 305.

A variety of other devices and systems may communicate with network 360 regarding information related to traffic direction gesture recognition. For example, other devices 380 and vehicles 390 may send and receive data 364, which may include traffic metrics, lane and road information, or any other data associated with pedestrians, traffic directors, or gesture recognition.

In some embodiments, a navigation system 370 may exchange, with network 360, data 362 related to traffic and road conditions, vehicle destination(s), or other data related to navigation. In some embodiments, data 362 may supplement or replace information stored in a database 372 of navigation system 370. In various embodiments, navigation system 370 may be implemented within vehicle 305 or another vehicle in communication with network 360. In some embodiments, vehicle 305 may communicate directly with any of navigation system 370, other devices 380, or other vehicles 390.

FIGS. 1-3 provide examples of a vehicle that may implement traffic direction gesture recognition. However, numerous other types or configurations of vehicles or other systems may implement the methods and systems described herein. FIGS. 4-6 and 8 are high-level flowcharts illustrating various methods and techniques to implement traffic direction gesture recognition, according to some embodiments. The various components described above may implement these techniques as well as various other systems.

Figure 4:
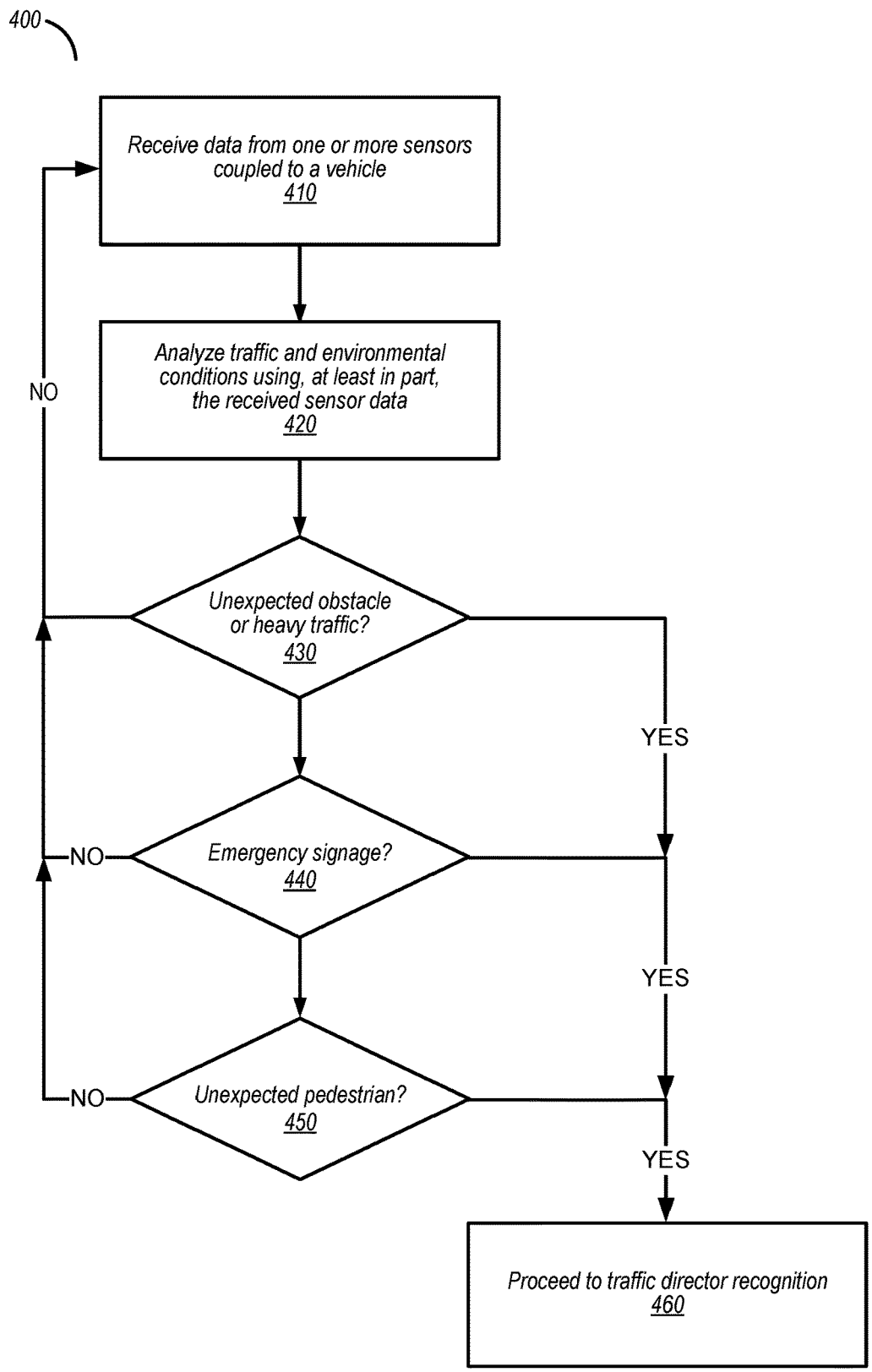
FIG. 4 is a high-level flowchart illustrating various methods and techniques of recognizing a traffic diversion, according to some embodiments.

FIG. 4 is a high-level flowchart illustrating various methods and techniques of recognizing a traffic diversion, according to some embodiments. In some embodiments one or more elements of method 400 may be implemented within a processor, for example processor 210 of vehicle 110 as described with reference to FIG. 2. According to various example embodiments, one or more of the steps of method 400 may be implemented remotely from the vehicle for which traffic direction gesture recognition is implemented.

At step 410 of method 400, data is received from one or more sensors coupled to the vehicle for which traffic direction gesture recognition is implemented. As described herein, sensor data may include information about an environment surrounding a vehicle, including data about pedestrians and other obstacles, abnormal traffic conditions, and other information about the vicinity in which traffic direction gesture recognition is implemented, for example the gestures, three-dimensional size, three-dimensional velocity, and three-dimensional location of such vehicles and obstacles.

At step 420, traffic and environmental conditions are analyzed, at least in part using the received sensor data. Step 420 may include performing some or all of the functions described herein with reference to environmental analysis module 212 of FIG. 2. For example, step 420 may include any of detecting an abnormal traffic condition, detecting pedestrians, detecting pedestrian characteristics, detecting possible traffic directors, or detecting gestures.

As discussed herein, in some embodiments, various traffic metrics describing characteristics of nearby vehicles and obstacles may be calculated. Traffic hazards may be noted, especially where the hazard is serious enough that it might necessitate overriding any portion of a typical process for identifying traffic direction gestures.

At steps 430-450, the vehicle or environmental analysis module according to some embodiments attempts to determine whether an abnormal traffic condition exists. For example, at step 430 the vehicle looks for unexpected obstacles or heavier-than-expected traffic. At step 440, the vehicle looks for emergency signage. At step 450, the system determines whether an unexpected pedestrian is present. If none of those conditions exists, control may pass back to step 410 according to some embodiments.

At each of steps 430-450 according to some embodiments, if the described hazard is detected, the vehicle or environmental analysis module may proceed at step 460 to a traffic director detection mode. Example traffic director detection methods are described below with reference to FIG. 5.

Figure 5:
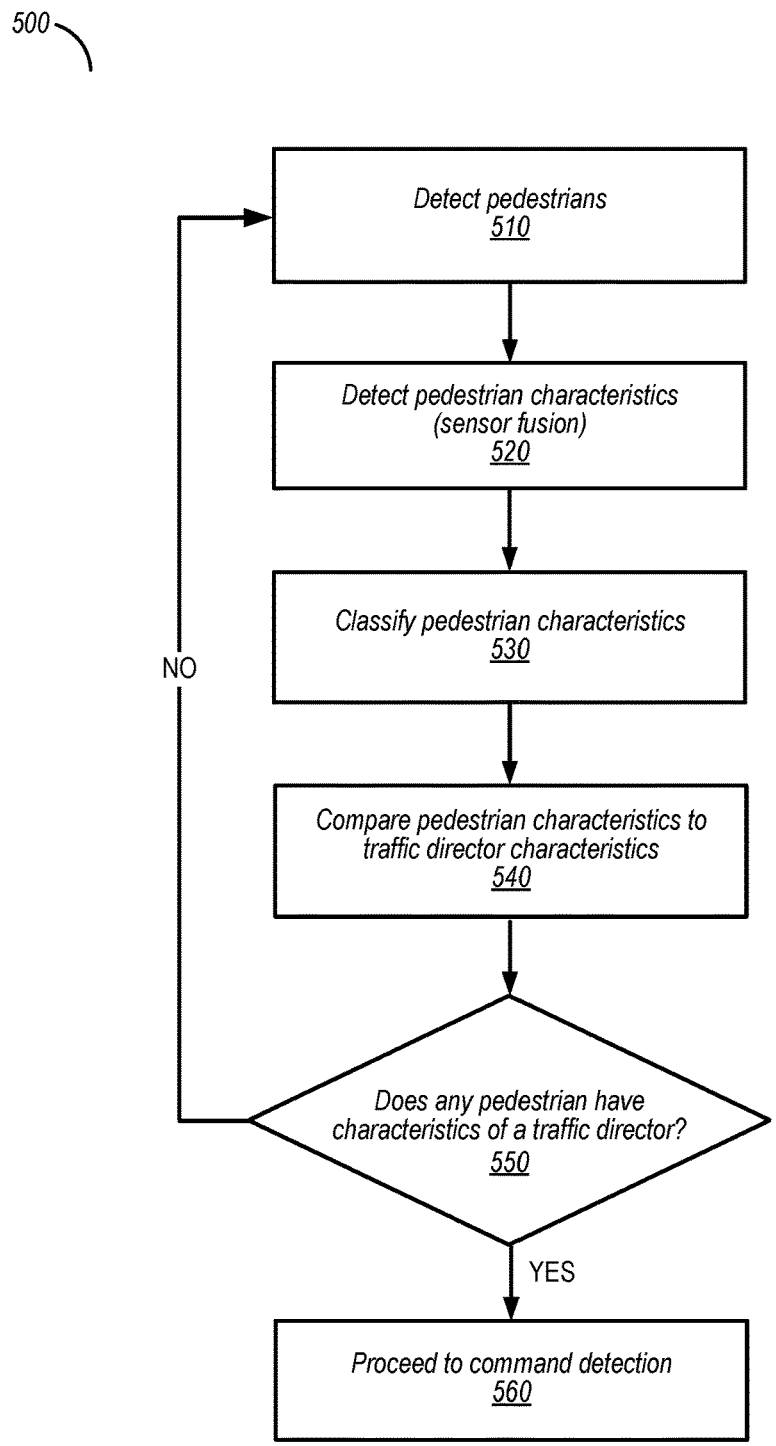
FIG. 5 is a high-level flowchart illustrating various methods and techniques of detecting a traffic director, according to some embodiments.

FIG. 5 is a high-level flowchart illustrating various methods and techniques of detecting a traffic director, according to some embodiments. In some embodiments, one or more elements of method 500 may be implemented within a processor, for example processor 210 of vehicle 110 as described with reference to FIG. 2. According to various example embodiments, one or more of the steps of method 500 may be implemented remotely from the vehicle for which traffic direction gesture recognition is implemented.

At step 510, according to some embodiments, a vehicle or environmental analysis module may detect pedestrians. For example, an environmental analysis module may project lidar obstacle points into a calibrated image plane of a camera of a vehicle. The environmental analysis module may further implement various methods such as machine-learning-based pedestrian detection based on aggregated channel features, adaptive boosting, or neural networks. In some example embodiments, each piece of data available to an environmental analysis module (e.g. colors, signs, gestures, etc.) may be combined or fused and analyzed using a random forest classifier.

At step 520, according to some embodiments, a vehicle or environmental analysis module may detect characteristics of pedestrians, which it may characterize at step 530. In some situations, the appearance of a pedestrian acting as a traffic director may include distinguishing features. For example, various authorities may wear particular colors (e.g. bright yellow or orange, or dark blue) when directing traffic. This information may, for example, be stored in a database, learned by the environmental analysis module, or a combination thereof.

In some embodiments, a pedestrian may hold a road sign, for example, one or more of a "SLOW," "STOP," "CROSSING," or "DETOUR" sign. In other examples, temporary or permanent road signs may be taken into account by the environmental analysis module 212, in combination or independently of a detected traffic director, and/or independently of whether the sign is held by a pedestrian At step 540, according to some embodiments, a vehicle or environmental analysis module may attempt to characterize detected pedestrians by comparing pedestrian characteristics to traffic director characteristics in order to decide at step 550 whether any pedestrian has characteristics of a traffic director. For example, if a pedestrian wears a known uniform of law enforcement, the pedestrian may be characterized as a traffic director. In other examples, a pedestrian may be recognized as a traffic director simply by using a recognized and detected valid traffic direction gesture.

At step 550, if no pedestrian is detected to exhibit characteristics of a traffic director, control may pass back to step 510. If one or more pedestrians has been detected as a traffic director or possible traffic director, control may pass at step 560 to a gesture detection mode. Example gesture detection modes are described below with reference to FIG. 6.

Figure 6:
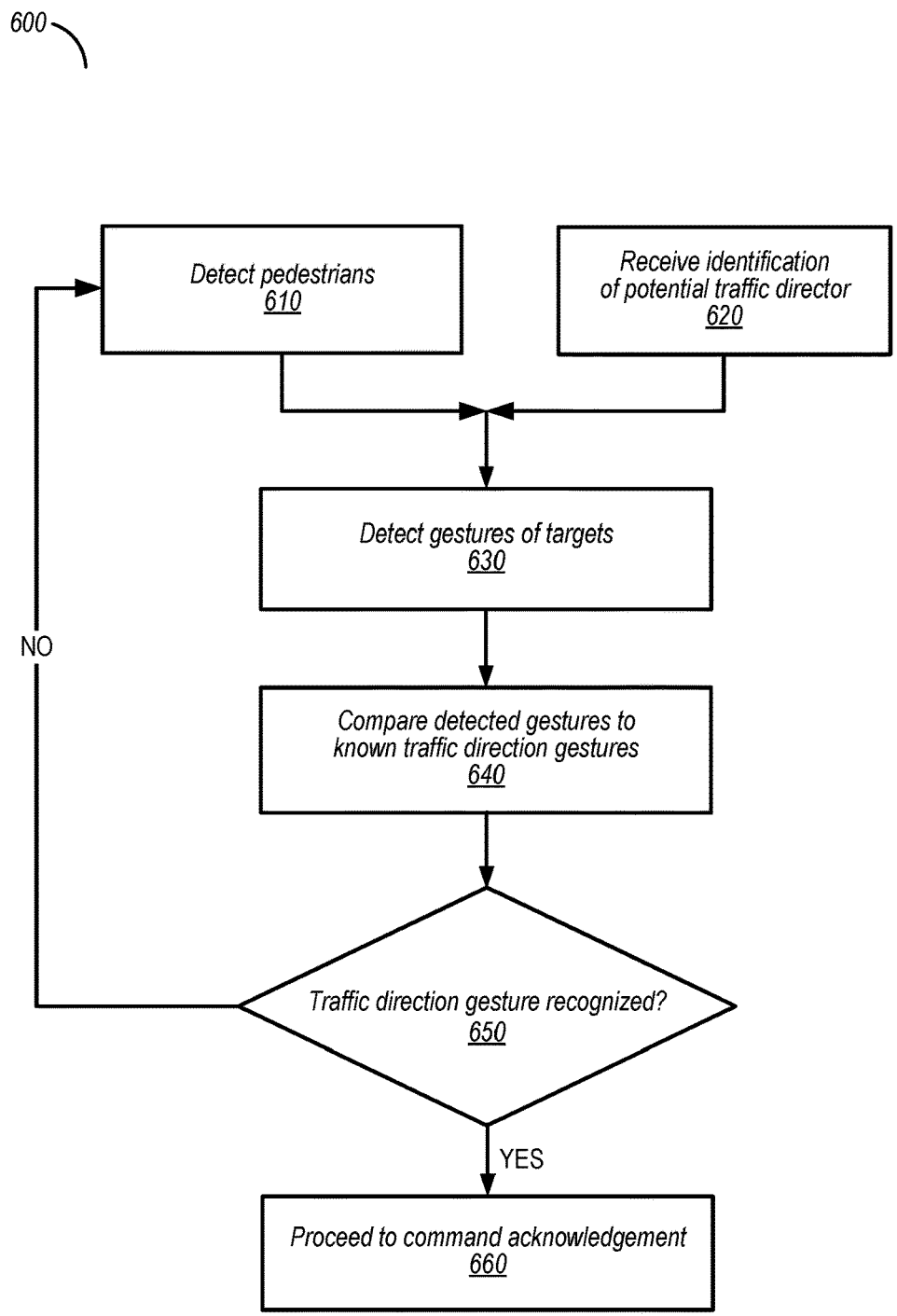
FIG. 6 is a high-level flowchart illustrating various methods and techniques of command detection, according to some embodiments.

FIG. 6 is a high-level flowchart illustrating various methods and techniques of command detection, according to some embodiments. In some embodiments, one or more elements of method 600 may be implemented within a processor, for example processor 210 of vehicle 110 as described with reference to FIG. 2. According to various example embodiments, one or more of the steps of method 600 may be implemented remotely from the vehicle for which traffic direction gesture recognition is implemented.

Command detection may begin at step 610 with detection of pedestrians, for example by any means described in detail herein with reference to FIG. 2, FIG. 5, or FIG. 1. Alternatively, command detection may begin at step 620 with one or more traffic directors or possible traffic directors already identified, for example by the processes described herein with reference to FIG. 2 or FIG. 5.

At step 630, gestures of identified pedestrians may be detected. For example, a movement of a pedestrian's arms, head, legs, etc. may be detected as potential gestures. In some embodiments, these movements must be separated from typical behavior of pedestrians, such as movements inherent to walking.

According to some embodiments, a pedestrian who makes a gesture known to an environmental analysis module or gesture recognition module to be a traffic direction gesture may be identified as acting as a traffic director. In some embodiments, the identification as a traffic director may further require concurrent detection of an abnormal traffic condition, particularly if the environmental analysis module can detect no other distinguishing characteristic of the pedestrian that suggests the pedestrian is validly acting as a traffic director.

At step 640, detected pedestrian gestures may be compared to known command gestures to determine if a traffic director or possible traffic director is attempting to issue a command to the vehicle. For example, gesture recognition module may search a local or remote database for known gestures that match a recognized gesture.

According to some embodiments, an environmental analysis module or gesture recognition module 214 may employ a hidden Markov model, Recurrent Neural Network, or other sequential classifier—applied, for example, as a spatio-temporal classification of a pedestrian's activity. A hidden Markov model, Recurrent Neural Network, or other sequential classifier may be developed, for example, for a "directing traffic" state, which if detected would indicate that a pedestrian is a likely traffic director.

If no pedestrian gesture is recognized as a command gesture, then at step 650, control may pass back to step 610 or 620. Where a pedestrian gesture has been recognized as a command, for example a command to maneuver the vehicle, control may pass at step 660 to a command acknowledgement logic. An example command acknowledgement method is described below with reference to FIG. 8.

Figure 7:
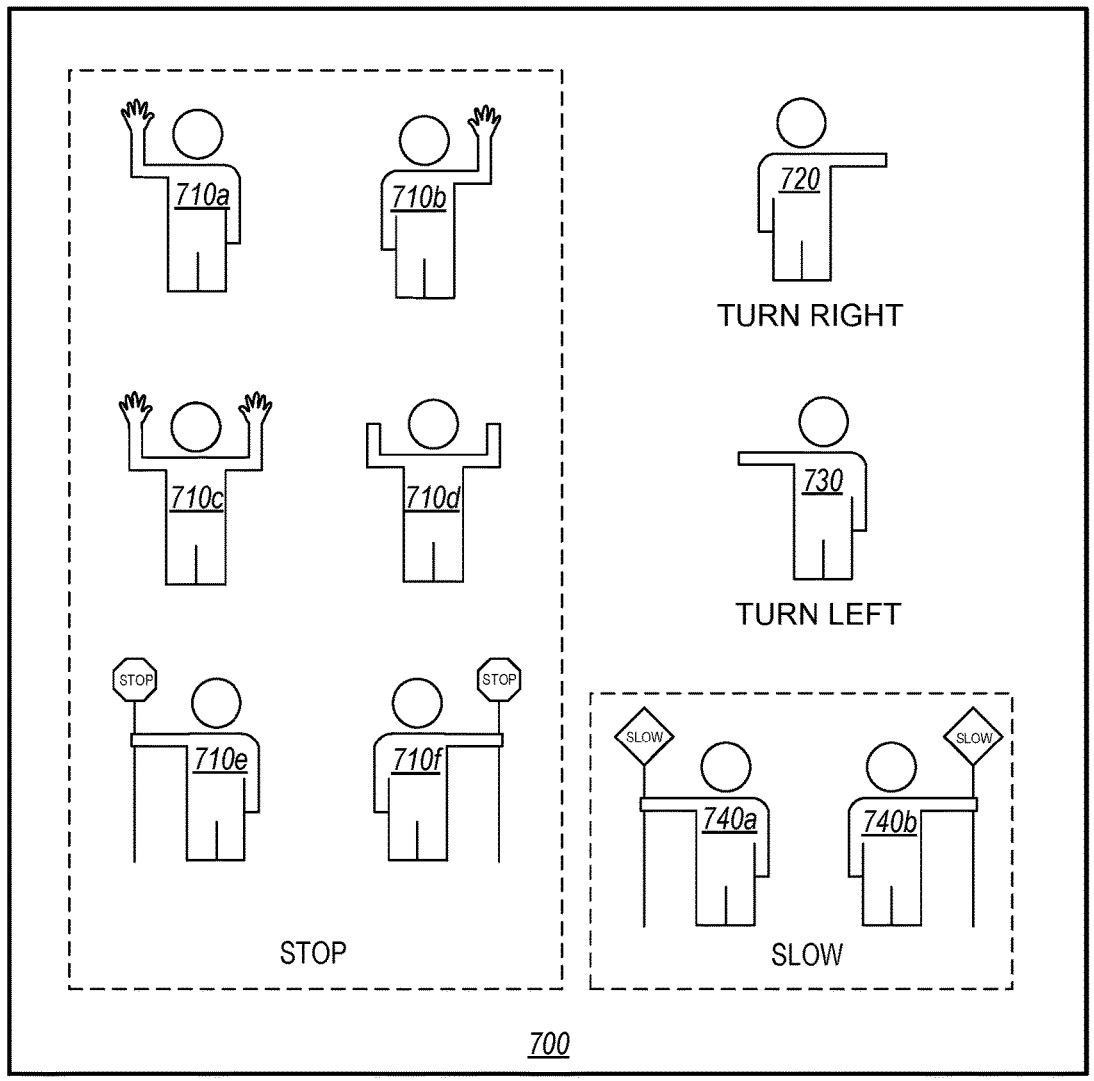
FIG. 7 shows an example traffic direction gesture database including several examples of traffic direction gestures, according to some embodiments.

FIG. 7 shows an example traffic direction gesture database including several examples of traffic direction gestures, according to some embodiments.

Gestures 710a-710f indicate several examples of a gesture indicating a "STOP" command. To perform gestures 710a and 710b, a traffic director holds up one of his or her hands. To perform gestures 710c and 710d, a traffic director holds up both of his or her hands. Gestures 710e and 710f include a stop sign held in one hand of the traffic director. Similarly, gestures 740a and 740b include a slow sign held in one hand of the traffic director to indicate to a vehicle that the vehicle should slow its speed.

In performing example gesture 720, a traffic director holds out his or her left arm while facing a vehicle to indicate that the vehicle should turn right in the direction the arm is pointing. In performing example gesture 730, a traffic director holds out his or her right arm while facing a vehicle to indicate that the vehicle should turn left in the direction the arm is pointing.

One having ordinary skill in the art will understand that the example gestures of FIG. 7 are merely illustrative of a very few possible gestures, and that the specific gestures may vary, for example by region, country, and law or traffic enforcement jurisdiction.

Figure 8:
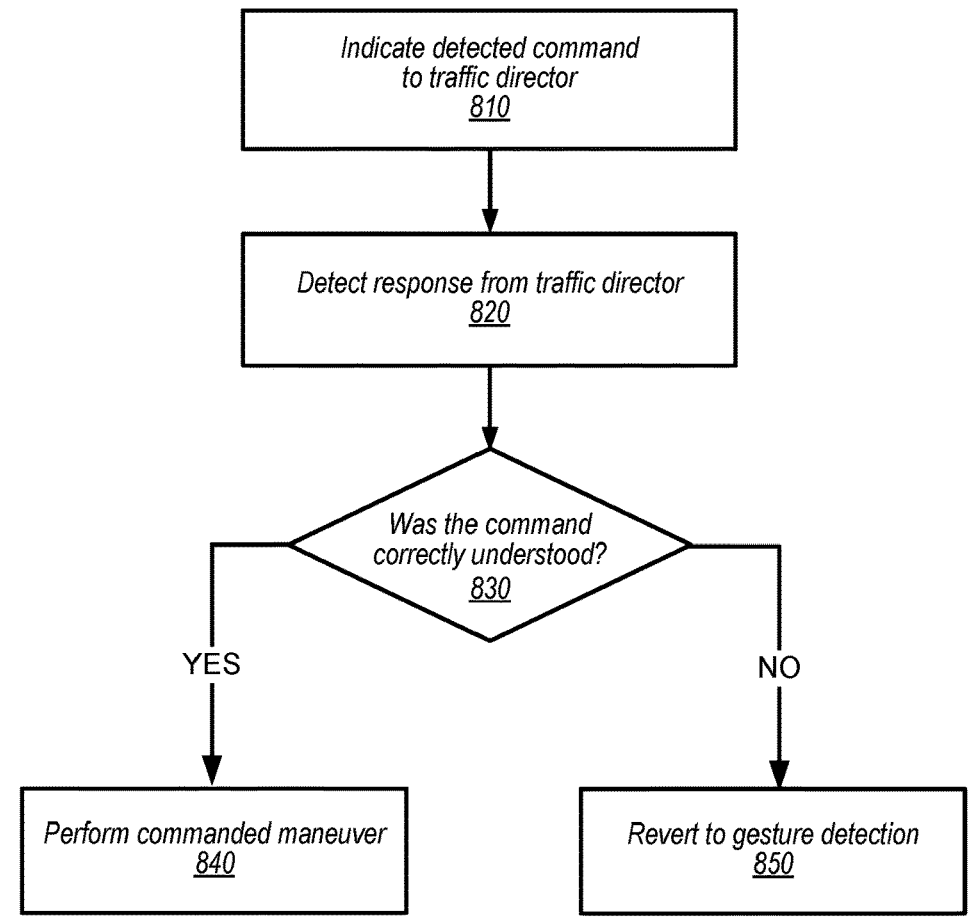
FIG. 8 is a high-level flowchart illustrating various methods and techniques of acknowledging a command and performing a commanded maneuver, according to some embodiments.

FIG. 8 is a high-level flowchart illustrating various methods and techniques of acknowledging a command and performing a commanded maneuver, according to some embodiments. In some embodiments, one or more elements of method 800 may be implemented within a processor, for example processor 210 of vehicle 110 as described with reference to FIG. 2. According to various example embodiments, one or more of the steps of method 800 may be implemented remotely from the vehicle for which traffic direction gesture recognition is implemented.

At step 810, according to some embodiments, a command acknowledgement module may operate a command acknowledgement device to communicate the vehicle's understanding of the detected command. According to some embodiments, the command acknowledgement device may include any or all of a turn signal, LED or other visual display, a video screen, or an audible notification.

At step 820, a traffic director according to some embodiments may acknowledge, positively or negatively, for example using another simple gesture (e.g. thumbs up or down) whether a vehicle has understood the traffic command correctly. A vehicle or environmental analysis module may detect the traffic director's acknowledgement using the same or similar techniques as described herein for detecting various other traffic direction gestures. In some embodiments, a command acknowledgement or traffic director acknowledgement may be made electronically, for example as a signal to an autonomous control or other computing system.

If the vehicle has correctly understood the traffic direction signal at 830, the vehicle may proceed directly to performing the commanded maneuver or maneuvers at 840. Various control systems typical of autonomous vehicles may be called on to complete the necessary maneuvers.

If the vehicle has misunderstood a command or, for example, the traffic director has not issued a command, or a vehicle has mistaken a normal pedestrian for a traffic director, control may revert to a gesture detection logic at step 850.

According to some embodiments, if a gesture is recognized, for example, by matching a known maneuver command, a vehicle may perform the maneuver immediately. In other embodiments, vehicle may acknowledge the recognized command or seek confirmation from the traffic director as described herein.

Figure 9:
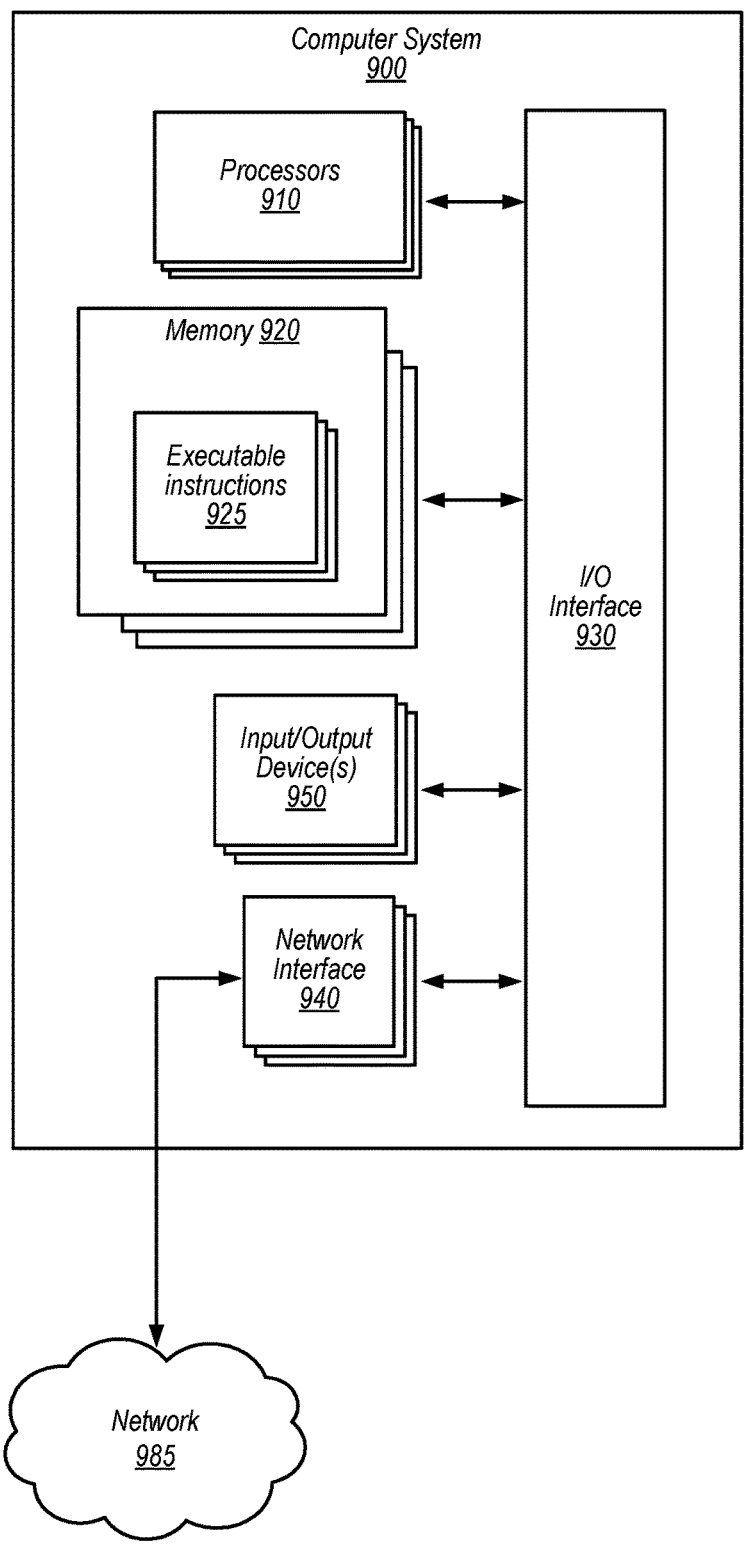
FIG. 9 illustrates a computer system that may be configured to include or execute any or all of the embodiments described herein.

FIG. 9 illustrates a computer system that may be configured to include or execute any or all of the embodiments described herein. In different embodiments, computer system 900 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of automated capture of image data for points of interest may be executed in one or more computer systems 900, which may interact with various other devices. Note that any component, action, or functionality described above with respect to FIGS. 1 through 8 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices, which can include one or more user interface (also referred to as "input interface") devices. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store program instructions, data, etc. accessible by processor 910. For example, memory 920 of computer system 900 may include executable instructions 925 for performing various tasks. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 920 may be configured to implement some or all of a traffic direction gesture recognition system, incorporating any of the functionality described above. Additionally, existing control data of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 900. Multiple input/output devices may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

Memory 920 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:
1. A system, comprising:
one or more sensors configured to detect one or more datasets associated with an environment within a range of a vehicle, the one or more datasets comprising data associated with one or more obstacles in the environment; and one or more processors coupled to the one or more sensors and configured to:
    detect an abnormal traffic condition using the one or more datasets;
    detect a pedestrian in the environment;
    identify the pedestrian as a traffic director based, at least in part, on the detected abnormal traffic condition; and
    recognize at least one command communicated by the traffic director for the vehicle to perform at least one commanded maneuver.

2. The system of claim 1, wherein identifying a pedestrian acting as a traffic director further comprises analyzing at least the sensor data of the one or more sensors to associate at least one characteristic of the traffic director with at least one record of a database of traffic director characteristics, and the system further comprises a command acknowledgement device coupled to the one or more processors and configured to communicate acknowledgement of the traffic director and of the at least one commanded maneuver.

3. The system of claim 1, wherein to recognize the at least one command communicated by the traffic director, the one or more processors are further configured to associate one or more detected movements of the traffic director with at least one record of a database of known gestures, and the system further comprises a command acknowledgement device coupled to the one or more processors and configured to communicate acknowledgement of the traffic director and of the at least one commanded maneuver.

4. The system of claim 1, further comprising: a vehicle control system configured to direct the vehicle to perform the at least one commanded maneuver.

5. The system of claim 4, further comprising: a command acknowledgement device coupled to the one or more processors and configured to communicate acknowledgement of the traffic director and of the at least one commanded maneuver.

6. The system of claim 5, wherein the command acknowledgement device comprises one or more of a vehicle turn signal, an LED display, or a video screen.

7. The system of claim 5, wherein the one or more processors are further configured to recognize a confirmation signal from the traffic director, the confirmation signal indicating whether the system has properly identified the at least one commanded maneuver.

8. The system of claim 5, wherein the one or more processors are further configured to recognize an additional signal from the traffic director, and revert from performing the at least one commanded maneuver in accordance with the recognized additional signal from the traffic director.

9. The system of claim 1, wherein the at least one command is communicated by at least one of a gesture, a sign, and an audible signal.

10. The system of claim 1, wherein the one or more sensors comprise a camera.

11. The system of claim 1, wherein the one or more sensors comprise a lidar detection sensor.

12. A method, comprising:
    detecting, by one or more vehicle sensors, one or more datasets associated with an environment within a range of a vehicle, the one or more datasets comprising data associated with one or more obstacles in the environment;
    performing by one or more processors coupled to the one or more vehicle sensors:
        receiving data of the one or more datasets from the one or more vehicle sensors;
        detecting an abnormal traffic condition using the one or more datasets;
        detecting a pedestrian in the environment;
        identifying the pedestrian as a traffic director based, at least in part, on the detected abnormal traffic condition; and
        recognizing at least one command communicated by the traffic director for the vehicle to perform at least one commanded maneuver.

13. The method of claim 12, further comprising communicating, via a command acknowledgement device, acknowledgement of the traffic director and of the at least one commanded maneuver.

14. The method of claim 13, further comprising recognizing a confirmation signal from the traffic director, the confirmation signal indicating whether the at least one commanded maneuver has been properly identified.

15. The method of claim 14, wherein directing the vehicle to perform the at least one commanded maneuver is performed responsive to recognizing the confirmation signal, wherein the confirmation signal indicates that the at least one command maneuver has been properly identified.

16. The method of claim 13, further comprising recognizing an additional signal from the traffic director, and reverting from performing the at least one commanded maneuver in accordance with the recognized additional signal from the traffic director.

17. The method of claim 12, wherein identifying a pedestrian acting as a traffic director further comprises analyzing at least the sensor data of the one or more sensors to associate at least one characteristic of the traffic director with at least one record of a database of traffic director characteristics, the method further comprising communicating, via a command acknowledgement device, acknowledgement of the traffic director and of the at least one commanded maneuver.

18. The method of claim 12, wherein recognizing the at least one command communicated by the traffic director further comprises associating one or more detected movements of the traffic director with at least one record of a database of known gestures, the method further comprising communicating, via a command acknowledgement device, acknowledgement of the traffic director and of the at least one commanded maneuver.

19. The method of claim 12, further comprising directing the vehicle, via a vehicle control system, to perform the at least one commanded maneuver.

20. The method of claim 12, wherein the at least one command is communicated by at least one of a gesture, a sign, and an audible signal.

21. A non-transitory, computer-readable storage medium storing program instructions that when executed by one or more one or more processors cause the one or more processors to implement:
    receiving, from one or more vehicle sensors coupled to the one or more processors, data of one or more datasets detected by the vehicle sensors and associated with an environment within a range of a vehicle, the one or more datasets comprising data associated with one or more obstacles within the environment;
    detecting a pedestrian in the environment;
    detecting an abnormal driving condition using the one or more datasets;
    identifying the pedestrian as a traffic director based, at least in part, on the detected abnormal traffic condition; and recognizing at least one command communicated by the traffic director for the vehicle to perform at least one commanded maneuver.

22. The non-transitory, computer-readable storage medium of claim 19, wherein identifying a pedestrian acting as a traffic director further comprises analyzing at least the sensor data of the one or more sensors to associate at least one characteristic of the traffic director with at least one record of a database of traffic director characteristics, and the non-transitory, computer-readable storage medium further storing program instructions that when executed by the one or more computing devices cause the one or more computing devices to cause a command acknowledgement device coupled to the one or more computing devices to communicate acknowledgement of the traffic director and of the at least one commanded maneuver.

23. The non-transitory, computer-readable storage medium of claim 21, wherein recognizing the at least one command communicated by the traffic director further comprises associating one or more detected movements of the traffic director with at least one record of a database of known gestures, and the non-transitory, computer-readable storage medium further storing program instructions that when executed by the one or more computing devices cause the one or more computing devices to cause a command acknowledgement device coupled to the one or more computing devices to communicate acknowledgement of the traffic director and of the at least one commanded maneuver.

24. The non-transitory, computer-readable storage medium of claim 21, further comprising program instructions that when executed by the one or more computing devices cause the one or more computing devices to implement:

directing the vehicle to perform the at least one commanded maneuver.

25. The non-transitory, computer-readable storage medium of claim 24, further storing program instructions that when executed by the one or more computing devices cause the one or more computing devices to implement:

causing a command acknowledgement device coupled to the one or more computing devices to communicate acknowledgement of the traffic director and of the at least one commanded maneuver.

26. The non-transitory, computer-readable storage medium of claim 25, further comprising program instructions that when executed by the one or more computing devices cause the one or more computing devices to implement:

recognizing an additional signal from the traffic director, and revert from performing the at least one commanded maneuver in accordance with the recognized additional signal from the traffic director.

* * * * *